United States Patent [19]
McEwen et al.

[11] Patent Number: 5,973,913
[45] Date of Patent: Oct. 26, 1999

[54] NONAQUEOUS ELECTRICAL STORAGE DEVICE

[75] Inventors: Alan B. McEwen, Melrose; David A. Evans, Seekonk; Thomas J. Blakley, Woburn; Jay L. Goldman, Mansfield, all of Mass.

[73] Assignee: Covalent Associates, Inc., Woburn, Mass.

[21] Appl. No.: 08/910,146

[22] Filed: Aug. 12, 1997

[51] Int. Cl.$^6$ ................................. H01G 9/00; H01G 9/04
[52] U.S. Cl. ........................... 361/523; 361/525; 361/528; 361/532
[58] Field of Search ..................................... 361/502, 505, 361/523, 525, 527–529, 532, 434; 429/132, 135, 129, 246, 277.192, 30, 33

[56] References Cited

U.S. PATENT DOCUMENTS

| | | | |
|---|---|---|---|
| 4,408,259 | 10/1983 | Muranaka et al. | 361/434 |
| 4,725,926 | 2/1988 | Morimoto et al. | 361/502 |
| 4,725,927 | 2/1988 | Morimoto et al. | 361/502 |
| 5,418,682 | 5/1995 | Warren et al. | 361/502 |
| 5,478,676 | 12/1995 | Turi et al. | 429/234 |
| 5,518,836 | 5/1996 | McCullough | 429/94 |
| 5,552,238 | 9/1996 | Carlin et al. | 429/50 |
| 5,552,241 | 9/1996 | Mamantov et al. | 429/103 |
| 5,585,999 | 12/1996 | De Long et al. | 361/505 |
| 5,621,607 | 4/1997 | Farahmandi et al. | 361/502 |

OTHER PUBLICATIONS

Arbizzani et al., "Electronically Conducting Polymers and Activated Carbon: Electrode Materials in Supercapacitor Technology," Adv. Mater. vol:8 No.4, pp. 331–334 (1996).

Bonhote et al., "Hydrophobic, Highly Conductive Ambient–Temperature Molten Salts," Inorg. Chem. vol. 35: pp. 1168–1178 (1996).

Carlin et al., "Dual Intercalating Molten Electrolyte Batteries," J. Electrochem. Soc., vol. 141: No. 7, L73–L76 (1994).

Conway et al., "Characterization of Behavior and Mechanisms of Self–Discharge of Electrochemical Capacitors in Relation to that at Batteries," Proceedings of the Fifth International Seminar on Double Layer Capacitors and Similar Energy Devices, Florida Educational Seminars, Dec., 1995.

Conway et al., "The Electrolyte Factor in Supercapacitor Design and Performance: Conductivity, Ion–Pairing and Solvation," Proceedings of the Fourth International Seminar on Double Layer Capacitros and Similar Energy Storage Devices, Florida Educational Seminars, Dec., 1994.

Conway, B.E., in Electrochemcial Capacitors, F.M. Delnick and M. Tomkiewicz, Editors, "Supercapacitor behavior resulting from pseudocapacitance associated with redox processes", PV95–29, p. 15, The Electrochemical Society Proceedings Series, Pennington, NJ (1996).

(List continued on next page.)

*Primary Examiner*—Kristine Kincaid
*Assistant Examiner*—Anthony Dinkins
*Attorney, Agent, or Firm*—Weingarten, Schurgin, Gagnebin & Hayes LLP

[57] ABSTRACT

An electrochemical capacitor is disclosed that features two, separated, high surface area carbon cloth electrodes sandwiched between two current collectors fabricated of a conductive polymer having a flow temperature greater than 130° C., the perimeter of the electrochemical capacitor being sealed with a high temperature gasket to form a single cell device. The gasket material is a thermoplastic stable at temperatures greater than 100° C., preferably a polyester or a polyurethane, and having a reflow temperature above 130° C. but below the softening temperature of the current collector material. The capacitor packaging has good mechanical integrity over a wide temperature range, contributes little to the device equivalent series resistance (ESR), and is stable at high potentials. In addition, the packaging is designed to be easily manufacturable by assembly line methods. The individual cells can be stacked in parallel or series configuration to reach the desired device voltage and capacitance.

8 Claims, 5 Drawing Sheets

OTHER PUBLICATIONS

Cooper et al. Proceedings of the 8th International Symposium on Molten Salts, R.J. Gale, G. Blomgren, and H. Kojima, Editors, PV 92–16, pp. 386–396 "New, Stable, Ambient–Temperature Molten Salts," The Electrochemical Society: Pennington, NJ (1992).

Fuller et al., "Structure of 1–Ethyl–3–methylimidazolium Hexafluorophosphate: Model for Room Temperature Molten Salts," J. Chem. Soc., Chem. Commun., pp. 299–300 (1994).

Huggins et al., "Three–Dimensional Charge Storage Via Topotactic Insertion Reactions," The Electrochemical Society Proceedings vol. 95–29, pp. 1–14.

Ishikawa et al., "Electric Double–Layer Capacitor Composed of Activated Carbon Fiber Cloth Electrodes and Solid Polymer Electrolytes Containing Alkylammonium Salts," *J. Electrochem. Soc.,* vol. 141: No. 7, (1994).

Koch et al., "The Interfacial Stability of Li with Two New Solvent–Free Ionic Liquids: 1,2–Dimethyl–3–propylimidazolium Imide and Methide'" J. Electrochem. Soc., vol. 142: No. 7 (1995).

Koch et al., "The Intrinsic Anodic Stability of Several Anions Comprising Solvent–Free Ionic Liquids," J. Electrochem. Soc., vol. 143: No. 3 (1996).

Koch et al., "High Voltage, Ionic Liquids For Electrochemical Capacitors," The Fourth International Seminar on Double Layer Capacitors and Similar Energy Storage Devices, Dec. 14, 1994.

Koch et al., "The Performance of Solvent–Free Ionic Liquid Electrolytes in Electrochemical Capacitors," The Fifth International Seminar on Double Layer Capacitors and Similar Energy Storage Devices, Dec. 4–6, 1995.

Koresh et al., "Double Layer Capacitance and Charging Rate of Ultramicroporous Carbon Electrode," J. Electrochem. Soc. vol. 124: No. 9 pp. 1379–1385.

Matsuda et al., "New Electric Double–Layer Capacitors Using Polymer Solid Electrolytes Containing Tetraalkylammonium Salts," J. Electrochem. Soc., vol. 140: No. 7, L109–L110 (1993).

McEwen et al., "EMIPF$_6$ Based Nonaqueous Electrolytes For Electrochemical Capacitors," Abstract No. 707, p. 861, The Electrochemical Society Meeting Abstracts, vol. 96–2, San Antonio, TX, Oct. 6–11, 1996.

McEwen et al., "Nonaqueous Electrolytes for Electrochemical Capacitors: Imidazolium Cations and Inorganic Fluorides with Organic Carbonates," J. Electrochemical Society, vol. 144: L84 (1997).

McEwen et al., "Nonaqueous Double Layer Capacitors: Electrolyte and Packaging Considerations For High Voltage Devices," Proceedings of the Sixth International Seminar on Double Layer Capacitors and Similar Energy Storage Devices, Florida Educational Seminars, Dec. 9–11, 1996.

McEwen et al., "EMIPF$_6$ Based Nonaqueous Electrolytes For Electrochemical Capacitors," Elecrochemical Capacitors II, F.M. Delnick, D. Ingersoll, X. Andrieu, and K. Naoi, Editors PV96–25, p. 313, The Electrochemical Society Proceedings Series, Pennington, NJ (1997).

Murphy, T.C., "Update on Ultracapacitor Development For Transportation Applications," The Electrochemical Society Proceedings vol. 95–29 pp. 269–280.

Nanjundiah et al., "Effect of CO–Solvents on Capacitance Measurements in Ionic Liquids," Electrochemical Society Proceedings vol. 96–25 pp. 301–312.

Papageorgiou et al., "The Performance and Stability of Ambient Temperature Molten Salts for Solar Cell Applications," J. Electrochem. Soc. vol. 143: No. 10 pp. 3099–3108 (1996).

Ren et al., "Ultracapacitors Using P– and N– Dopable poly(3–Arylthiophene)S," The Electrochemical Society Proceedings vol. 95–29 pp. 138–161.

Takeuchi et al., "Solid polymer electrolyte, battery and solid–state electric double–layer capacitor using this electrolyte as well as processes for their manufacture," CA Selects Plus: Batteries and Fuel Cells, Abstract No. 637063, Issue 23, p. 2 , 1996.

Ue et al., "Properties Of New Quaternary Ammonium Salts For Electrochemical Capacitors," Electrochemical Society Proceedings vol. 96–25 pp. 289–300.

Ue et al., "Ionic Radius of $(CF_3SO_2)_3C^-$ and Applicabilty of Stokes Law to Its Propylene Carbonate Solution," J. Electrochem. Soc., vol. 143: No. 11 L270–L272 (1996).

Ue et al., "Electrochemical Properties of Organic Liquid Electrolytes Based on Quanternary Onium Salts for Electrical Double–Layer Capacitors," J. Electrochem. Soc., vol. 141, No.11:pp. 2989–2996 (1994).

Ue et al., "Mobility and Ionic Association of Lithium and Quaternary Ammonium Salts in Propylene Carbonate and γ–Butyrolactone," J. Electrochem. Soc., vol. 141, No. 12:pp. 3336–3342 (1994).

Ue et al., "Nonaqueous electrolyte solution with high electric conductivity for electrochemical capacitor," No.: 728245, 1996 CAPLUS, Japanese Patent Application No. 95–48743, Abstract Only.

Kita et al., "Electrochemical devices containing two electrolytes," No.: 428795, 1995 CAPLUS, Japanese Patent Application No. 93–106143, Abstract Only.

Endo et al., "Electric double–layer capacitor using nonaqueous electrolyte containing cyclobutane– and cyclopropane–derived quaternary ammonium salt," No.: 138075, 1993 CAPLUS, Japanese Patent Application No. 90–408585, Abstract Only.

Endo et al., "Electric double–layer capacitor using nonaqueous electrolyte containing quaternary ammonium salt derived from pyridazine, pyrimidine, or pyrazine," No.: 138074, 1993 CAPLUS, Japanese Patent Application No. 90–408584, Abstract Only.

Morimoto, Takeshi, "Electrolytic double–layer capacitors containing high–performance organic solvents," No.: 49936, 1993 CAPLUS, Kagaku Kogyo (1992), 43(12), 998–1004.

Okamoto et al., "Electric double–layer capacitors with organic electrolytes," No.: 583103, 1990 CAPLUS, Japanese Patent Application Number 88–313397, Abstract Only.

Matsuzaki et al., "Electric double–layer capacitors using a nonaqueous electrolyte," No.: 507627, 1990 CAPLUS, Japanese Patent Application No. 88–230582, Abstract Only.

NONAQUEOUS ELECTRICAL STORAGE DEVICE

GOVERNMENT RIGHTS

Part of the work leading to this invention was carried out with United States government support provided under Department of Defense contract F33615-94-C-2469 and Department of Energy contract F602-96ER82149. Therefore, the U.S. government has certain rights in this invention.

FIELD OF THE INVENTION

This invention relates to nonaqueous electrical storage devices and particularly to nonaqueous electrochemical capacitors.

BACKGROUND OF THE INVENTION

Capacitors based on energy storage at a charged electrode-electrolyte interface (i.e., the double layer) are widely used in applications requiring power densities greater than batteries and energy densities greater than electrolytic capacitors. High surface area activated carbon is commonly used as the electrode in these electrochemical capacitors. Double-layer capacitors are grouped in the general classification of electrochemical capacitors. Electrical storage devices utilizing pseudocapacitance as the storage mechanism (e.g., $RuO_2$) or polymer electrode redox-based systems are also electrochemical capacitors. Electrochemical capacitors are being slated for uses as diverse as pulse power, bridge power, and load leveling for various applications including electric vehicles and cellular communications. As electrochemical capacitors become more prevalent, higher capacitance and high temperature stability become desirable properties for new devices.

BRIEF SUMMARY OF THE INVENTION

In accordance with the teaching of the invention, an improved electrochemical capacitor packaging system is disclosed having components of corrosion resistant steel or polymer components that are stable at temperatures greater than 100° C. The electrochemical capacitor of the invention includes two separated high surface area, e.g., carbon, electrodes sandwiched between two current collectors fabricated of a conductive polymer having a flow temperature greater than 130° C. or a corrosion resistant steel. The perimeter of the electrochemical capacitor is sealed with a high temperature gasket to form a single cell device. The gasket material is a thermoplastic stable at temperatures greater than 100° C., preferably a polyester or a polyurethane, and having a reflow temperature above 130° C. but below the softening temperature of the current collector material.

Previous packaging designs based on polymer components utilizing polyolefin type materials (e.g., polyethylene and polypropylene) are not stable at temperatures much above 80° C. The packaging for the capacitor of the invention has good mechanical integrity over a wide temperature range, contributes little to the device equivalent series resistance (ESR), and is stable at high potentials. In addition, the packaging is designed to be easily manufacturable by assembly line methods.

Our improved packaging system results in individual cell pouches which can be stacked in parallel or series configuration to reach the desired device voltage and capacitance. This approach also facilitates the manufacturability of these pouches and allows the use of less material for current collector and gaskets.

BRIEF DESCRIPTION OF THE DRAWINGS

Other features and advantages of the invention will be apparent from the following detailed description of the invention, taken in conjunction with the accompanying drawings in which.

DETAILED DESCRIPTION OF THE INVENTION

Single cell nonaqueous electrochemical capacitors of the invention are constructed in a prismatic configuration, as described in more detail below. To obtain the high voltage electrochemical capacitor devices of the invention, sufficient single cells are series connected to achieve the desired voltage. The voltage (V), capacitance (C), and resistance (R), for a number (n) of series connected capacitors are determined according to equations I to III where the subscript "cell" gives the corresponding value of a single cell.

$$V = \sum_n V_{cell} \qquad \text{I}$$

$$1/C = \sum_n (1/C_{cell}) \qquad \text{II}$$

$$R = \sum_n R_{cell} \qquad \text{III}$$

For a parallel connection, equations IV–VI apply.

$$V = V_{cell} \qquad \text{IV}$$

$$C = \sum_n C_{cell} \qquad \text{V}$$

-continued $$1/R = \sum_n 1/R_{cell} \qquad \text{VI}$$

The number of cells is selected to achieve desired device voltage, capacitance and resistance values. These simple equations can be complicated by capacitance variances between cells and differential charging rates within a multicell array when a large number of cells are combined to reach very high voltages. Typically, for example, large devices are designed not to exceed 2.5 V/cell on average to avoid any one cell going over 3 V. We have demonstrated the construction of 30 V and 100 V multicell electrochemical capacitors based on a series stack of devices of this invention.

A key aspect of packaging design to obtain high cell voltage is avoiding corrosion or "passive layer formation" at the high potentials experienced at the positive electrode. We have determined, and it is well known, that aluminum forms a "passive film" at potentials well within the potentials achieved even for a 2.5 V/cell electrochemical capacitor. This so-called "passive film" is aluminum oxide and contributes to the series resistance and capacitance by placing a dielectric film (i.e., electrolytic capacitor) in series with the anodic electrode. This, in effect, results in a voltage drop across the current collector/electrolyte interface, limiting the performance of the device.

This problem is avoided in the cell of the invention by use of a conductive polymer with high temperature stability that contributes negligibly to the device ESR (equivalent series resistance) and allows achieving a high level of performance. Alternatively, corrosion resistant, e.g., stainless, steel current collectors will give good results.

Single Cell

Figure 1A:
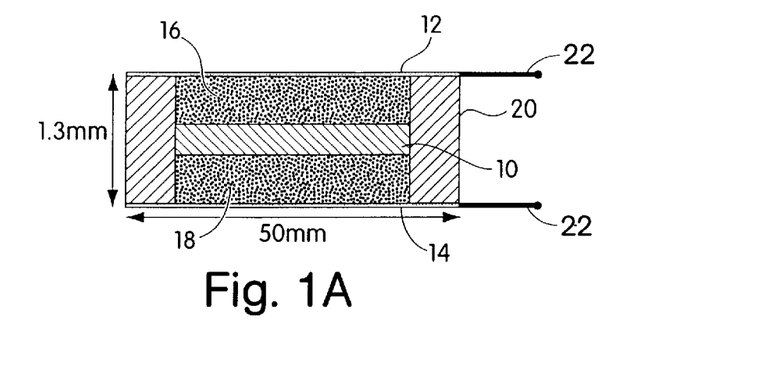
FIG. 1A shows a single cell pouch capacitor of the invention.

Single cell nonaqueous electrochemical capacitors were constructed in a prismatic configuration. Referring to FIG. 1A, two separated high surface area conductive carbon cloth electrodes 16 and 18 were sandwiched between 12 $\mu$m thick current collectors 12 and 14, preferably a corrosion resistant or "stainless" steel or, more preferably, a conductive polymer having a flow temperature greater than 130° C. The electrodes may be of any high surface area conductive material. The electrode material is selected for its thermal properties described herein, electrochemical stability, physical structure and good wetting with a suitable electrolyte. Typical examples include commercially available high surface area carbon fibers which may be woven into a cloth, high surface area particulate carbon, possibly with a binder, carbon fibers, anchored carbon fibers, or any other possible electrode useable in electrochemical capacitors such as n- and p-doped polymer electrodes. A pressure contact is typically applied between the current collectors 12 and 14 and the carbon fiber fabric. Electrodes 16, 18 are separated by a separator 10 immersed in an electrolyte in a non-aqueous solvent. The separator is typically (a) a solid material that is not electrically conductive, and (b) is made of a porous material to allow ionic conductivity of the electrolyte through the material. Various materials may be used selected from, for example, woven glass filter material, porous polymer materials and cellulose based materials. Glass filter membranes, as well as porous polypropylene and polycarbonate materials, have been found to be advantageous as separators. In general, the separator is a thin material that is mechanically robust and contributes little to the resistance of the overall cell. Preferred separator materials are, e.g., MSI polycarbonate exposed to nuclear radiation and etched to achieve a desired pore size, for example 5 to 8 microns, or Whatman GF/A glass fiber filter. The perimeter of the cell is sealed with a thermoplastic, high temperature gasket 20 to form a single cell prismatic device. The seal 20 is a thermoplastic, typically of a polyester or polyurethane nature, that flows above 100° C. but below the softening temperature of current collectors 12 and 14. The material of gasket seal 20 is chosen to have good internal cohesion during a reflow treatment and good adhesion to the current collections. Any suitable high temperature thermoplastic can be typically used for gasket 20. Some examples are from Beamis Associates, Inc., Shirley, Mass. (e.g., 5209, 5214 polyesters and 3209, 3214 polyurethanes).

Of significant concern in designing cell packaging is material stability over useful ranges, such as between and including temperatures of −50° C. to 100° C. Therefore, the gasket materials as well as the current collectors used in the cell of the invention are stable to above 100° C. This precludes the use of polyethylene and polypropylene as gasket materials or current collectors (when doped to obtain conductivity). A conductive polymer current collector material is provided stable to temperatures at which the thermoplastic gasket material is reflowed and has a softening temperature above 130° C. A useful polymeric material for the current collectors 12, 14 is Coer-X of Rexam Graphics, S. Hadley, Mass., described in U.S. Pat. No. 5,478,676. The current collectors may be provided on the outer side with an aluminium or copper layer, for ease of welding thereto. Also, a 316 or 316L stainless steel foil can be used as a current collector. Cells have been tested from −55° C. to 120° C. with no loss in mechanical integrity.

Figure 2:
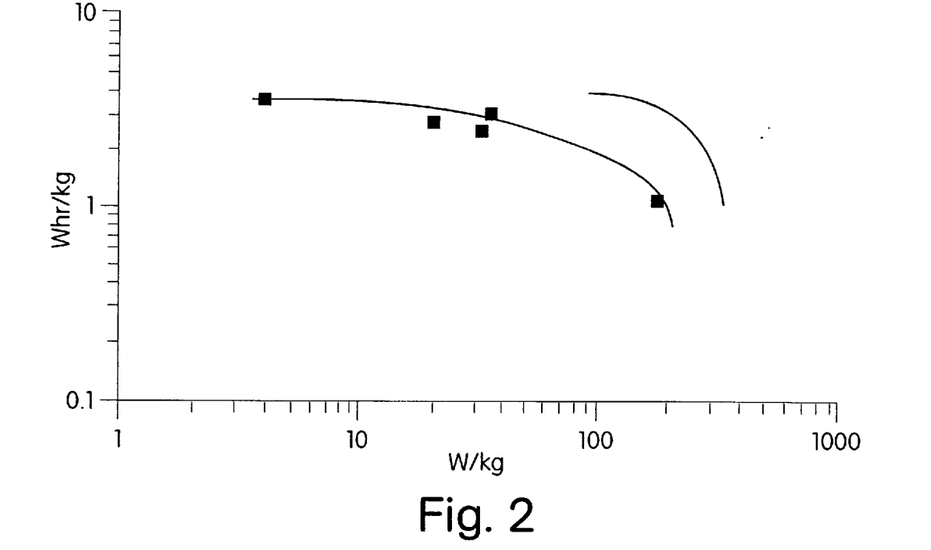
FIG. 2 shows a Ragone plot determined from constant current and constant power discharge data on an unoptimized single cell of FIG. 1A.

An important advantage of the polymer current collector material is the lower cost and lower density as compared to stainless steel current collectors. An additional benefit, is an observed reduction in the ESR of the cell from 3 Ω to less than 0.2 Ω. This is due to a better contact between the current collector and the carbon electrodes. The cells of the present configuration shown above have a capacitance of 11 F at 3 V with an ESR of 0.15 Ω. Referring to FIG. 2, the Ragone plot depicted is determined from constant current and constant power discharge data on this unoptimized single cell package.

The single cells are typically of any size, those tested were 5×5 cm with an active area of 13 cm$^2$ and a total weight and volume of 2.6 g and 2.5 ml, respectively. These were constructed, as shown, and vacuum backfilled with the desired electrolyte, preferably EMIPF$_6$ in an alkyl carbonate solvent or solvent free ionic liquid, and sealed, all in an Ar filled dry box. Improved nonaqueous electrolytes are described in co-pending U.S. Appl. Ser. No. 08/910,143, the detailed description of which is attached as Appendix A herein. Other electrolytes include tetraalkylammonium salts in various organic solvents (e.g., Et$_4$NBF$_4$ in PC).

Figure 1B:
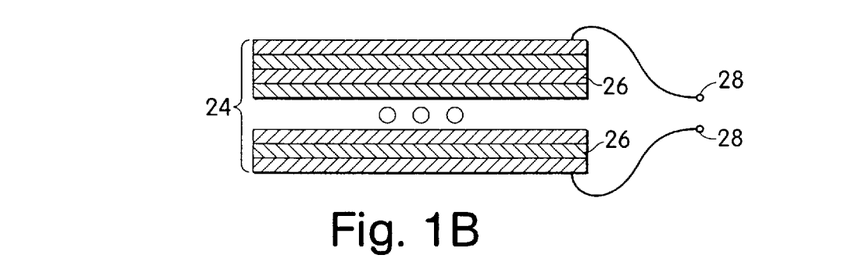
FIG. 1B shows a stack of cells for high voltage application.
Figure 1C:
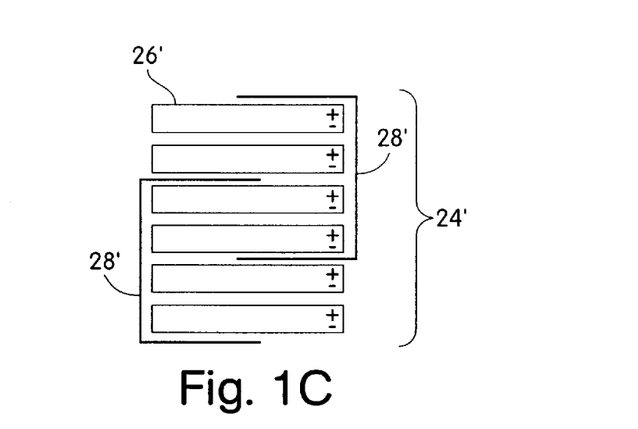
FIG. 1C shows parallel connection of a stack of cells of FIG. 1A for increased capacitance.

The cell of FIG. 1A has connections 22 to external circuitry or can be electrically contacted via the external surfaces of conductors 16 and 18. As shown in FIG. 1B and 1C, the cells may be series a parallel connected to form a stack 24, 24' of individual cells 26, 26'. Conductors 28, 28' connect external circuitry. Electrical contact between cells is achieved by external contact of the cell sacks.

Figure 1D:
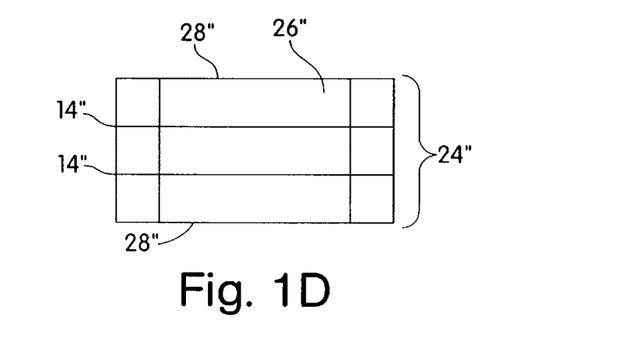
FIG. 1D shows a shared collection of stacked cells.

FIG. 1D shows a series stack of cells 24" having common bipolar current collectors 14" between cells 26".

A custom built MACCOR series 4000 cycler was used for collecting constant power and current cycling data. Extended cycling data were obtained using a constant current charge/discharge cycle (50 mA), where each cycle takes roughly 18 minutes. A single cell can exhibit a 3 V, 11 Farad capacity. A stack of cells, under pressure of typically 100 psi, can exhibit a 100 V and 0.3 Farad capacity.

Figure 3:
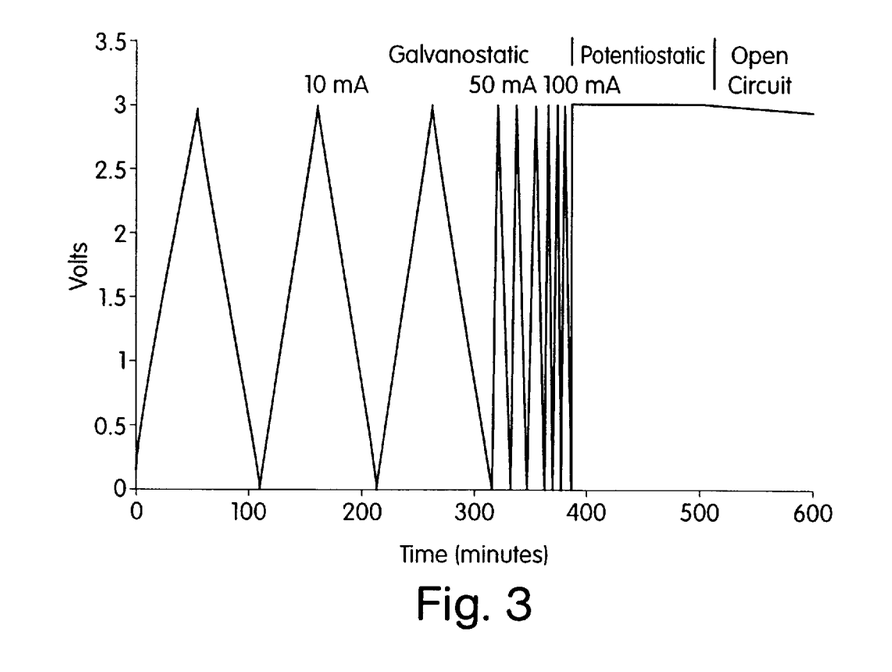
FIG. 3 hows three galvanostatic charge/discharge cycles for each of the currents (10, 50 and 100 mA) followed by a potentiostatic charge at 3 V for 2 hr and an open circuit rest for 2 hr, from a single cell pouch of the invention.

Galvanostatic and potentiostatic charging of the single cells exhibited excellent reversibility (greater than 98%) and charge storage capability. Referring to FIG. 3, three charge/discharge cycles at three currents (10, 50, and 100 mA), followed by a potentiostatic charge (held at potential by an external source) for 2 hours and a subsequent 2 hours at open circuit are depicted. The cells have a capacitance of 11 F at 3 V, resulting in a packaged energy density of 5.3 Whr/kg and 5.5 Whr/l. Only a 70 mV drop in voltage was observed after 2 hours at open circuit. Over 2000 charge/discharge cycles were obtained with little (5%) drop in capacity.

Figure 4A:
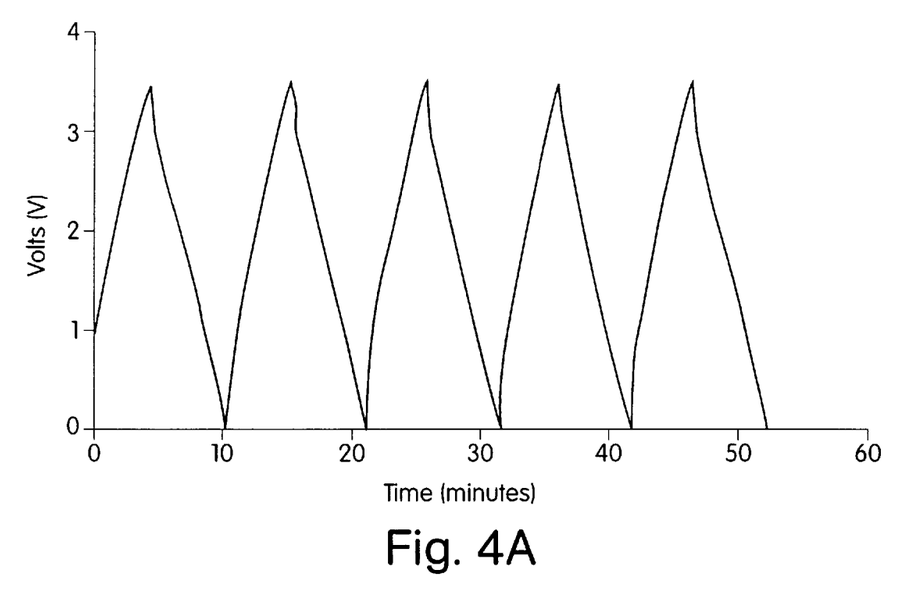
FIGS. 4A and 4B show galvanostatic charge/discharge results of the single cell of FIG. 1A at 3.5 and 4.0 V per cell (100 mA), respectively.
Figure 4B:
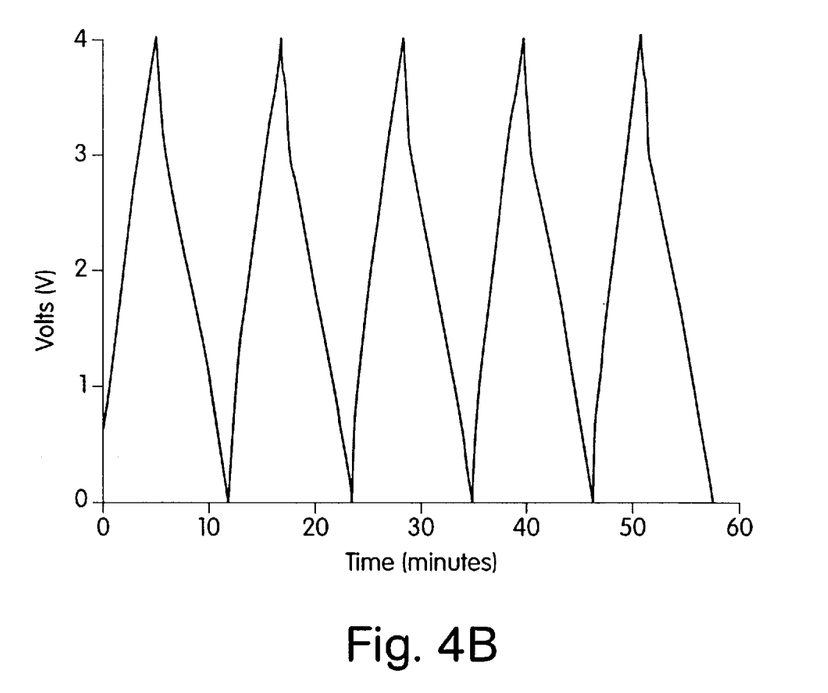

Additionally, we have charged the single cells to 3.5 and 4.0 V with good efficiency (greater than 98%) and reversibility (see FIGS. 4A and 4B).

Multicell

Figure 5:
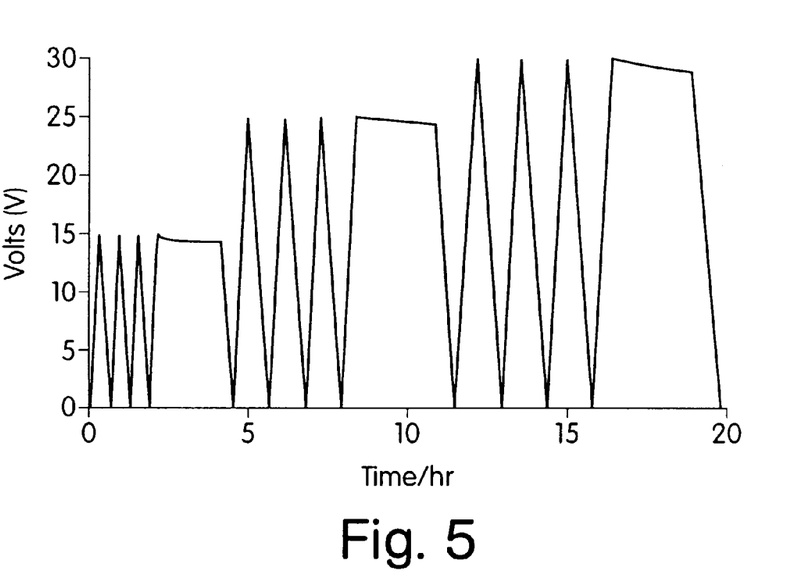
FIG. 5 shows the initial galvanostatic charge/discharge cycles observed at 10 mA from a 30 V multicell device of the invention.

A 30 V 1 Farad multicell device was constructed from twelve cells in a series configuration as in FIG. 1B. Referring to FIG. 5, the charging results obtained are shown. The initial galvanostatic charge/discharge was at 10 mA with three cycles at 15 V, three at 25 V, and finally three at 30 V. In addition to the three galvanostatic charge/discharge cycles at each voltage, a final potentiostatic charge (30 min) and an open circuit rest (2 hr.) were performed. This device was cycled for 1000 cycles at several currents (10–100 mA) with little loss in energy.

Figure 6:
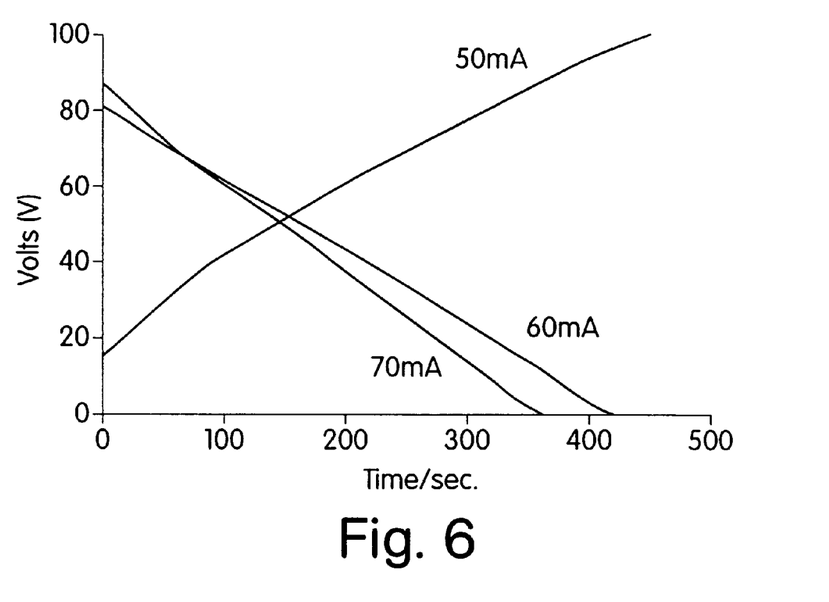
FIG. 6 shows the initial galvanostatic charge/discharge cycles for a 100 V multicell device.

A 100 V 0.3 F device was also assembled and tested. Initial galvanostatic charge/discharge results are presented in FIG. 6. Shown in FIG. 6 is the voltage on the stack as a function of time for a given constant current charge or discharge. As can be seen, a voltage of 100 V is reached in roughly 480 seconds at a charging current of 50 mA.

Figure 7:
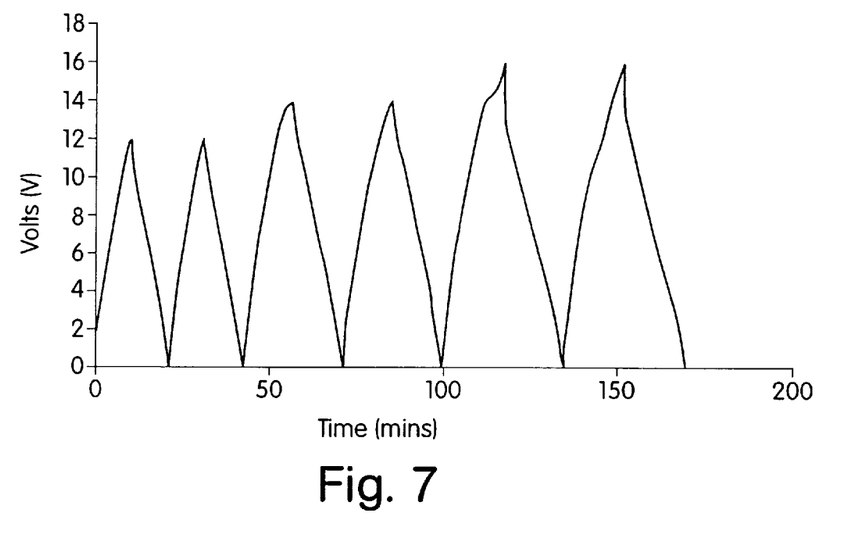
FIG. 7 shows galvanostatic charge/discharge data (50 mA) from a four celled device of the invention.

In another test of the packaging system, a four cell device was charged to 12, 14, and 16 V, with good results, as shown in FIG. 7 and Table 1, below.

TABLE 1

Performance characteristics of a four cell device.
Discharge capacitance determined at constant current (50 mA).

| Device Voltage | Volts/cell | Capacitance (F) | Energy (J) | J/g |
|---|---|---|---|---|
| 12 | 3.0 | 2.57 | 185 | 13.5 |
| 14 | 3.5 | 2.95 | 289 | 21.1 |
| 16 | 4.0 | 3.00 | 384 | 28.0 |

The cells may also be parallel connected as shown in FIG. 1C or they may be connected in combined series and parallel configurations for desired combinations of voltage, capacitance and resistance.

The cells of the present invention are particularly useful in applications where capacitances greater than in standard electrolytic or dielectric capacitors are needed in energy storage and in signal processing.

The present invention finds further application in memory protection of consumer electronics, currently requiring 5.5 V and 0.02–1 F. The invention is also useful in EV applications, with hybrid propulsion and regenerative breaking systems, of electric trains/subway systems which use electrochemical capacitors to store energy, UPS power supply applications due to the significantly higher energy of electrochemical cells relative to electrostatic capacitors, higher power density than batteries, the deep discharge capability, long life time, and fast charge capability. In addition, the low maintenance of electrochemical capacitors compared to batteries is very attractive for long term applications. In addition, cellular communication applications benefit from the burst power capabilities offered by electrochemical capacitors.

While the present invention has been described in conjunction with a preferred embodiment, one of ordinary skill, after reading the foregoing specification, will be able to effect various changes, substitutions of equivalents, and other alterations to the compositions and methods set forth herein. It is therefore intended that the protection granted by Letters Patent hereon be limited only by the definitions contained in the appended claims and equivalents thereof.

We claim:

1. A nonaqueous electrical storage device comprising:

first and second high surface area electrodes in contact with a nonaqueous electrolyte;

a conductive polymer current collector in contact with each of said electrodes, said polymer current collector having a flow temperature greater than 130° C.;

a separator, between and in contact with each of said electrodes, said separator maintaining a physical spacing in said electrolyte while allowing ionic conduction between each of said electrodes; and a gasket sealing said storage device, said gasket comprising a thermoplastic material that is stable above 100° C., said thermoplastic material also having a reflow temperature above 130° C. but below a softening temperature of said conductive polymer current collector.

2. A nonaqueous electrical storage device of claim 1, wherein said storage device is configured as a capacitor.

3. A nonaqueous electrical storage device of claim 1, wherein each of said electrodes, is selected from the group consisting of a carbon cloth electrode a particulate carbon electrode with or without a binder, a loose carbon fiber electrode, an anchored carbon fiber electrode, and a doped polymer electrode.

4. A nonaqueous electrical storage device of claim 1, wherein said thermoplastic material is a polyester or a polyurethane or a combination thereof.

5. A nonaqueous electrical storage device of claim 1 wherein said electrolyte is selected from the group consisting of $EMIPF_6$ in an alkyl carbonate solvent, tetralkylamine salts in an organic solvent, and $Et_4NBF_4$ in propylene carbonate.

6. A nonaqueous electrical storage device according to claim 1, comprising two or more individual storage devices connected in one of a series or parallel-stacking or combinations thereof.

7. A nonaqueous electrical storage device of claim 6 wherein said storage devices are adjacent one another and at least two of said devices sharing a single bipolar current collector.

8. A nonaqueous electrical storage device comprising:

first and second high surface area electrodes in contact with a nonaqueous electrolyte;

a conductive, corrosion resistant steel current collector in contact with each of said electrodes; and a gasket sealing said storage device, said gasket comprising a thermoplastic material that is stable above 100° C., said thermoplastic material also having a reflow temperature above 130° C. but below a softening temperature of said current collector.

* * * * *

UNITED STATES PATENT AND TRADEMARK OFFICE
CERTIFICATE OF CORRECTION

PATENT NO. : 5,973,913
DATED : 10/26/99
INVENTOR(S) : McEwen et al.

It is certified that error appears in the above-identified patent and that said Letters Patent is hereby corrected as shown below:

Column 1, line 8, change "contract F602-96ER82149" to --contract FG02-96ER82149--

Signed and Sealed this

First Day of August, 2000

Attest:

Attesting Officer

Q. TODD DICKINSON

Director of Patents and Trademarks